United States Patent
Tanaka

(10) Patent No.: US 8,795,112 B2
(45) Date of Patent: Aug. 5, 2014

(54) LUBRICANT AND OIL-FREE CHAIN

(75) Inventor: Koji Tanaka, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 947 days.

(21) Appl. No.: 12/677,921

(22) PCT Filed: Jul. 24, 2008

(86) PCT No.: PCT/JP2008/063245
§ 371 (c)(1),
(2), (4) Date: Jul. 21, 2010

(87) PCT Pub. No.: WO2009/034784
PCT Pub. Date: Mar. 19, 2009

(65) Prior Publication Data
US 2010/0292039 A1    Nov. 18, 2010

(30) Foreign Application Priority Data
Sep. 13, 2007    (JP) ................................ 2007-237969

(51) Int. Cl.
*F16G 13/02*    (2006.01)
*C10M 169/04*    (2006.01)

(52) U.S. Cl.
USPC ................ 474/232; 508/110; 208/18; 585/1; 585/10; 585/13; 384/114

(58) Field of Classification Search
USPC ......... 474/232; 508/591, 110; 208/18; 585/1, 585/10, 13; 384/114
See application file for complete search history.

(56) References Cited

U.S. PATENT DOCUMENTS

| | | | |
|---|---|---|---|
| 4,995,852 A | 2/1991 | Takahashi et al. | |
| 5,490,730 A | 2/1996 | Akita et al. | |
| 7,939,477 B2 * | 5/2011 | Hashida et al. | 508/182 |
| 2002/0098989 A1 * | 7/2002 | Heimann et al. | 508/136 |
| 2003/0073532 A1 * | 4/2003 | Koschig | 474/228 |

(Continued)

FOREIGN PATENT DOCUMENTS

| | | |
|---|---|---|
| JP | 1149048 U | 10/1989 |
| JP | 07053984 A | 2/1995 |

(Continued)

OTHER PUBLICATIONS

European Search Report mailed Apr. 19, 2011 for the corresponding European patent application No. 08791497.4.

*Primary Examiner* — William E Dondero
*Assistant Examiner* — Mark K Buse
(74) *Attorney, Agent, or Firm* — Leason Ellis LLP

(57) ABSTRACT

An oil-free chain is constructed by alternately connecting a pair of outer link plates connected using pins and a pair of inner link plates connected using oil-impregnated bushings into which the adjacent pins of the outer link plates adjacent to the inner link plates are fitted. The oil-impregnated bushings are impregnated with a lubricant having a kinematic viscosity in the range of ISO-VG grade 46 to 460, the weight % of an ingredient having the highest content among the elution ingredients obtained by the GPC method is 95 wt % or more, Mn is 800 or more and 2300 or less, and the ratio of Mw to Mn is 1.0 or more and 1.3 or less. Oil film breakage at the sliding portions of the bushings is suppressed from occurring and the oil film strength is high such that an oil-free chain has a sufficiently long abrasion elongation-resistant life.

2 Claims, 1 Drawing Sheet

(56) References Cited

U.S. PATENT DOCUMENTS

| | | |
|---|---|---|
| 2003/0236177 A1 | 12/2003 | Wu et al. |
| 2005/0176539 A1* | 8/2005 | Hirschmann ............... 474/228 |
| 2005/0250657 A1* | 11/2005 | Wu et al. ................... 508/591 |
| 2006/0116303 A1* | 6/2006 | Iimura et al. ............... 508/591 |
| 2006/0157383 A1 | 7/2006 | Wu et al. |
| 2009/0118146 A1 | 5/2009 | Negoro et al. |
| 2010/0248880 A1* | 9/2010 | Fujiwara et al. ............ 474/209 |

FOREIGN PATENT DOCUMENTS

| | | |
|---|---|---|
| JP | 08105444 A | 4/1996 |
| JP | 09125086 A | 5/1997 |
| JP | 11140478 A | 5/1999 |
| JP | 11351338 A | 12/1999 |
| JP | 2004360731 A | 12/2004 |
| JP | 2005519184 T | 6/2005 |
| JP | 2005-325335 A | 11/2005 |
| JP | 2006070222 A | 3/2006 |
| JP | 2006176760 A | 7/2006 |
| JP | 2007056213 A | 3/2007 |
| JP | 2007126519 A | 5/2007 |
| JP | 2008081558 A | 4/2008 |
| WO | 2007132626 A1 | 11/2007 |

* cited by examiner

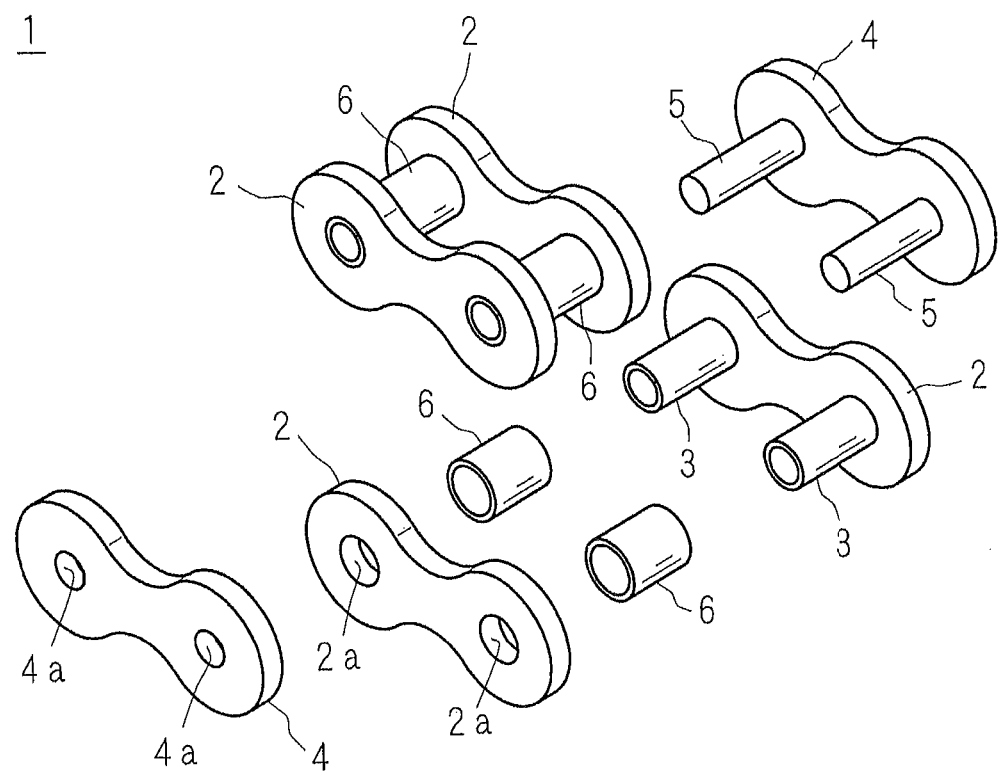

LUBRICANT AND OIL-FREE CHAIN

This application is the U.S. national phase application under 35 U.S.C. §371 of International Application No. PCT/JP2008/63245, filed on Jul. 24, 2008, which claims the benefit of Japanese Patent Application Serial No. 2007-237969, filed on Sep. 13, 2007. The International Application was published in Japanese on Mar. 19, 2009 as WO 2009/034784 under PCT Article 21(2).

BACKGROUND

1. Technical Field

The present invention relates to a lubricant impregnated in bushings comprising of a metal sintered body and to an oil-free chain being used for power transmission mechanisms, transport mechanisms, etc. and constructed so that the bushings make sliding contact with pins in a state that the lubricant impregnated in the bushings oozes out without additional lubrication.

2. Description of Related Art

Conventionally, chains such as bushing chains and roller chains are used for power transmission mechanisms and transport mechanisms. A bushing chain is constructed so that a pair of outer link plates connected to each other using two pins in both ends and a pair of inner link plates provided with two bushings in both ends, the two pins on the adjacent sides of two pairs of outer link plates being fitted in the two bushings, are connected alternately. In the case of a roller chain, rollers fitted on the bushings are further provided.

An oil-free chain is known which is constructed so that oil-impregnated bushings comprising of a sintered body impregnated with a lubricant are used as the bushings of the chain constructed as described above and so that the oil-impregnated bushings make sliding contact with pins in a state that the lubricant impregnated in the oil-impregnated bushings oozes out without additional lubrication.

Japanese Patent Application Laid-open Publication No. Hei 11-140478 discloses an invention relating to an oil composition for sintered oil-impregnated bearings, produced by blending 0.01 to 3.0 wt % of carboxylate ester and/or organic zinc sulfonate serving as a rust inhibitor with base oil.

In Japanese Patent Application Laid-open Publication No. Hei 11-140478, in the case that poly-α-olefin (PAO) or a hydride thereof is used as the base oil, it is assumed that the average molecular weight of the PAO is in the range of 200 to 1600, preferably 400 to 800.

In addition, Japanese Patent Application Laid-open Publication No. Hei 9-125086 discloses an invention relating to an oil composition for oil-impregnated bearings, comprising base oil containing polyolefin and polyol ester, wherein the weight ratio of polyolefin to polyol ester in the above-mentioned base oil is in the range of 20/80 to 80/20.

SUMMARY

The sintered oil-impregnated bearings according to Japanese Patent Application Laid-open Publication No. Hei 11-140478 are applied to the capstan bearings and motor bearings of portable radio-cassette recorders, etc. The sintered oil-impregnated bearings according to Japanese Patent Application Laid-open Publication No. Hei 9-125086 are applied to various motor bearings of automobile electrical equipment (such as fan motors), for example.

Unlike the bearings of shafts rotating at high speed, such as motor shafts, generally speaking, the bearings (bushings) of a chain make sliding contact with pins (or shafts) at low speed and high surface pressure, and the pins perform a oscillating movement.

Furthermore, from the point of view of fluidity, it is assumed to be preferable that the kinematic viscosity of the oil composition for the oil-impregnated bearings at 40° C. in Japanese Patent Application Laid-open Publication No. Hei 11-140478 is in the range of 5 to 100 mm$^2$/s and that the above-mentioned kinematic viscosity in Japanese Patent Application Laid-open Publication No. Hei 9-125086 is 100 cSt or less.

In an oil-free chain, a lubricant is sucked out from the pores of oil-impregnated bushings by the sliding motion (pumping action) of the pins fitted in the oil-impregnated bushings and oozes out due to expansion caused by frictional heat, whereby lubricity and abrasion resistance are attained. However, a lubricant that is easily impregnated in the bushings and easily discharged from the bushings has a small molecular weight, that is, a low polymerization degree, and tends to flow easily. Hence, the film strength becomes weak and the lubricant flows away. As a result, there is a problem of being unable to obtain satisfactory lubricity and abrasion resistance.

In other words, even if an oil-free chain is constructed by impregnating the lubricant according to Japanese Patent Application Laid-open Publication No. Hei 11-140478 or Japanese Patent Application Laid-open Publication No. Hei 9-125086 being suited for motor bearings in the bushings of the chain, there is a problem of being unable to obtain a satisfactorily long abrasion elongation-resistant life.

In consideration of the above-mentioned circumstances, the present invention is intended to provide a lubricant satisfactorily flowing out from the pores of bushings, suppressing oil film breakage at the sliding portions of the bushings and having high oil film strength during operation, and further ensuring that the bushings have a satisfactorily long abrasion resistant life in the case that the bushings are impregnated with the lubricant by constructing the lubricant so that the lubricant has a kinematic viscosity in the range of ISO-VG grade 46 to 460, the weight % of an ingredient having the highest content among the elution ingredients obtained under the GPC (gel permeation chromatography) measurement conditions described later is 95 wt % or more, the number average molecular weight (Mn) is 800 or more and 2300 or less, and the ratio (dispersion ratio) of the weight average molecular weight (Mw) to Mn is 1.0 or more and 1.3 or less.

Furthermore, the present invention is intended to provide a lubricant satisfactorily flowing out from the pores of bushings, suppressing oil film breakage at the sliding portions of the bushings and having high oil film strength during operation, and further ensuring that the bushings have a satisfactorily long abrasion resistant life in the case that the bushings are impregnated with the lubricant by constructing the lubricant so that the lubricant has a kinematic viscosity in the range of ISO-VG grade 46 to 460, the weight % of an ingredient having the highest content among the elution ingredients obtained under the GPC measurement conditions described later is less than 95 wt %, Mn is 800 or more and 2300 or less, and the dispersion ratio is 1.0 or more and 2.0 or less.

Moreover, the present invention is intended to provide an oil-free chain having a satisfactorily long abrasion elongation-resistant life, since by impregnating the above-mentioned lubricant in the bushings, the lubricant satisfactorily flows out from the pores of the oil-impregnated bushings during operation, oil film breakage at the sliding portions of the bushings is suppressed from occurring, and the oil film strength is high.

A lubricant according to a first aspect of the present invention is a lubricant impregnated in bushings comprising of a metal sintered body, wherein said lubricant has a kinematic viscosity provided by an ISO viscosity grade number in the range of VG 46 to 460, the weight % of an ingredient having the highest content among the elution ingredients obtained under the following GPC (gel permeation chromatography) measurement conditions is 95 wt % or more, and the number average molecular weight is 800 or more and 2300 or less, and the ratio of the weight average molecular weight obtained under the following GPC measurement conditions to the above-mentioned number average molecular weight is 1.0 or more and 1.3 or less.

[GPC Measurement Conditions]
Measuring instrument: GPC system manufactured by SHI-MADZU CORPORATION
Column: GPC KF-803 (SHODEX) 300 mm×8 mm (inside diameter), three pieces
Guard column: GPC-800P 10 mm×4.6 mm (inside diameter)
Column temperature: 40° C.
Mobile phase: tetrahydrofuran (GC grade)
Flow rate: 0.7 ml/min
Pressure: $2.9 \times 10^{-2}$ Pa
Detector: differential refractive index detector
Standard substance: TSK standard polystyrene manufactured by TOSOH CORPORATION In the present invention, since the number average molecular weight is 800 or more and 2300 or less, in the case that the lubricant is impregnated in the bushings, the lubricant satisfactorily flows out from the pores of the oil-impregnated bushings and does not flow out excessively from the sliding portions of the bushings, and oil film breakage is suppressed from occurring during operation.

Generally speaking, as the molecular weight of a lubricant becomes larger, the oil film strength thereof increases, but the kinematic viscosity thereof also becomes larger, whereby the impregnation of the lubricant into the pores of a sintered body becomes slow. However, since the lubricant according to the present invention has a kinematic viscosity in the range of ISO-VG grade 46 to 460 and the molecular weight and kinematic viscosity thereof are appropriate, the lubricant is satisfactorily impregnated in the bushings comprising of a sintered body.

In addition, since the molecular weight distribution of the lubricant is narrow, the oil film phase has uniformity. Moreover, since the number average molecular weight satisfies the above-mentioned requirements, the oil film strength is high and has less non-uniformity.

Consequently, the lubricity between the oil-impregnated bushings and the sliding faces of the shafts is maintained satisfactorily for a long time, and the oil-impregnated bushings have a satisfactorily long abrasion-resistant life.

A lubricant according to a second aspect of the present invention is a lubricant impregnated in bushings comprising of a metal sintered body, characterized in that said lubricant has a kinematic viscosity provided by an ISO viscosity grade number in the range of VG 46 to 460, the weight % of an ingredient having the highest content among the elution ingredients obtained under the following GPC (gel permeation chromatography) measurement conditions is less than 95 wt %, the number average molecular weight is 800 or more and 2300 or less, and the ratio of the weight average molecular weight obtained under the following GPC measurement conditions to the above-mentioned number average molecular weight is 1.0 or more and 2.0 or less.

[GPC Measurement Conditions]
Measuring instrument: GPC system manufactured by SHI-MADZU CORPORATION
Column: GPC KF-803 (SHODEX) 300 mm×8 mm (inside diameter), three pieces
Guard column: GPC-800P 10 mm×4.6 mm (inside diameter)
Column temperature: 40° C.
Mobile phase: tetrahydrofuran (GC grade)
Flow rate: 0.7 ml/min
Pressure: $2.9 \times 10^{-2}$ Pa
Detector: differential refractive index detector
Standard substance: TSK standard polystyrene manufactured by TOSOH CORPORATION In the present invention, since the number average molecular weight is 800 or more and 2300 or less, in the case that the lubricant is impregnated in the bushings, the lubricant satisfactorily flows out from the pores of the oil-impregnated bushings and does not flow out excessively from the sliding portions of the bushings, and oil film breakage is suppressed from occurring during operation.

Generally speaking, as the molecular weight of a lubricant becomes larger, the oil film strength thereof increases, but the kinematic viscosity thereof also becomes larger, whereby the impregnation of the lubricant into the pores of a sintered body becomes slow. However, since the lubricant according to the present invention has a kinematic viscosity in the range of ISO-VG grade 46 to 460 and the molecular weight and kinematic viscosity thereof are appropriate, the lubricant is satisfactorily impregnated in the bushings comprising of a sintered body.

In addition, the weight % of the elution ingredient having the highest content is less than 95 wt %, and the number of the elution ingredients is 2 or more. However, since the dispersion ratio is 1.0 or more and 2.0 or less and the molecular weight distribution is narrow, the oil film phase has uniformity.

Moreover, since the number average molecular weight satisfies the above-mentioned requirements, the oil film strength is high and has less non-uniformity.

Consequently, the lubricity between the oil-impregnated bushings and the sliding faces of the shafts is maintained satisfactorily for a long time, and the oil-impregnated bushings have a satisfactorily long abrasion-resistant life.

An oil-free chain according to a third aspect of the present invention is constructed by alternately connecting a pair of outer link plates connected by two pins and a pair of inner link plates connected by two oil-impregnated bushings into which the adjacent pins of said outer link plates adjacent to said inner link plates are fitted, wherein said oil-impregnated bushings are impregnated with said lubricant according to the first or second aspect of the present invention.

In the present invention, the lubricant satisfactorily flows out from the pores of the oil-impregnated bushings, the lubricant is suppressed from excessively flowing out from the sliding portions of the bushings, and oil film breakage at the sliding portions is suppressed from occurring during operation. In addition, the oil film phase has uniformity, and the oil film strength is high and has less non-uniformity, whereby the lubricity on the sliding faces is maintained satisfactorily. Consequently, the oil-free chain has a satisfactorily long abrasion elongation-resistant life.

The lubricant according to the first aspect of the present invention has a kinematic viscosity in the range of ISO-VG grade 46 to 460, the weight % of an ingredient having the highest content among the elution ingredients obtained under the GPC measurement conditions described above is 95 wt % or more, the number average molecular weight is 800 or more and 2300 or less, and Mw/Mn is 1.0 or more and 1.3 or less. Hence, in the case that the lubricant is impregnated in the bushings, the lubricant satisfactorily flows out from the pores of the oil-impregnated bushings, oil film breakage at the sliding portions is suppressed from occurring, the oil film phase has uniformity, and the oil film strength is high and has less non-uniformity during operation.

Consequently, the lubricity between the oil-impregnated bushings and the sliding faces of the shafts is maintained satisfactorily for a long time, and the oil-impregnated bushings serving as bearings have a satisfactorily long abrasion-resistant life.

The lubricant according to the second aspect of the present invention has a kinematic viscosity in the range of ISO-VG grade 46 to 460, the weight % of an ingredient having the highest content among the elution ingredients obtained under the GPC measurement conditions described above is less than 95 wt %, Mn is 800 or more and 2300 or less, and Mw/Mn is 1.0 or more and 2.0 or less. Hence, in the case that the lubricant is impregnated in the bushings, the lubricant satisfactorily flows out from the pores of the oil-impregnated bushings, oil film breakage at the sliding portions is suppressed from occurring, the oil film phase has uniformity, and the oil film strength is high and has less non-uniformity during operation.

Consequently, the lubricity between the oil-impregnated bushings and the sliding faces of the shafts is maintained satisfactorily for a long time, and the oil-impregnated bushings serving as bearings have a satisfactorily long abrasion-resistant life.

In the oil-free chain according to the third aspect of the present invention, the lubricant satisfactorily flows out from the pores of the oil-impregnated bushings, oil film breakage at the sliding portions is suppressed from occurring, the oil film phase has uniformity, and the oil film strength is high during operation, whereby the lubricity at the sliding portions is maintained satisfactorily. Consequently, the oil-free chain has a satisfactorily long abrasion elongation-resistant life.

The above and further objects and features will more fully be apparent from the following detailed description with accompanying drawings.

BRIEF DESCRIPTION OF THE SEVERAL VIEWS OF THE DRAWINGS

FIG. 1 is a partly perspective view showing an oil-free chain of a roller chain type according to Example 1 of the present invention.

DETAILED DESCRIPTION

The present invention will be described below specifically on the basis of the drawing showing the embodiment thereof.

A lubricant according to the present invention is a lubricant impregnated in bushings comprising of a metal sintered body. The lubricant has a kinematic viscosity in the range of ISO-VG grade 46 to 460, the weight % of a first ingredient (an ingredient having the highest content) among the elution ingredients obtained under the GPC measurement conditions described above is 95 wt % or more, the number average molecular weight is 800 or more and 2300 or less, and the ratio of the weight average molecular weight obtained under the GPC measurement conditions described above to the above-mentioned number average molecular weight is 1.0 or more and 1.3 or less.

Furthermore, another lubricant according to the present invention is a lubricant impregnated in bushings comprising of a metal sintered body. The lubricant has a kinematic viscosity in the range of ISO-VG grade 46 to 460, the weight % of a first ingredient among the elution ingredients obtained under the GPC measurement conditions described above is less than 95 wt %, the number average molecular weight is 800 or more and 2300 or less, and the ratio of the weight average molecular weight obtained under the above-mentioned GPC measurement conditions described above to the above-mentioned number average molecular weight is 1.0 or more and 2.0 or less.

Mineral oil, synthetic oil, animal/plant oil, etc. can be used as the base oil of the lubricant according to the present invention.

According to the classification by the composition, paraffinic hydrocarbons (% cp in the ring analysis (n-d-M method) is 50 or more) such as liquid paraffin, are taken as examples of mineral oil. According to the classification by purification method, bright stock obtained by subjecting a vacuum residue fraction to solvent deasphalting is taken as an example of mineral oil. According to the classification by use, process oil is taken as an example of mineral oil.

Examples of synthetic oil include PAO, polyphenyl ether, phosphate ester, silicone oil, halocarbon oil, polyalkylene glycol, diester and polyol ester.

One or two or more kinds of additives such as an oiliness agent, a rust inhibitor, an antioxidant, an extreme pressure agent and an anti-foaming agent can be combined and added as necessary to provide additional functions to the lubricant according to the present invention. It is preferable that these additives are contained more than 0 wt % and 10 wt % or less in the entire lubricant.

Long chain fatty acids such as stearic acid and oleic acid, and the salts thereof can be used as the above-mentioned oiliness agent.

Examples of the above-mentioned rust inhibitor include carboxylic acid, carboxylate, sulfonate and phosphate ester.

Examples of the above-mentioned antioxidant include DBPC (2,6-di-t-butylparacresol), phenyl-α-naphthylamine, zinc diallyldithiophosphate and benzotriazole.

Examples of the above-mentioned extreme pressure agent include dialkyl polysulfide, alkyl phosphate ester and zinc alkylthiophosphate.

Examples of the above-mentioned anti-foaming agent include dimethylpolysiloxane.

The type of the oil-free chain according to the present invention includes a bushing chain and a roller chain.

EXAMPLES

The present invention will be described in detail below with examples and comparative examples, but is not limited to these examples.

First, Examples and Comparative Examples in the case that the number of elution ingredients among the elution ingredients obtained under the GPC measurement conditions described above is one will be described below. Herein, the phrase "in the case that the number of elution ingredients is one" means that the weight % of an ingredient having the highest content among the elution ingredients obtained under the above-mentioned measurement conditions is 95 wt % or more.

Example 1

FIG. 1 is a partly perspective view showing an oil-free chain 1 of a roller chain type according to Example 1 of the present invention.

The inner link plate 2 and the outer link plate 4 of the oil-free chain 1 each have inward circular dents in both side fringes at the center portion of an elliptical flat member. The inner link plate 2 and the outer link plate 4 have a nearly figure eight shape and are provided with holes 2a and 2a and holes 4a and 4a respectively formed near both poles of the elliptical flat members. The plate width and the diameter of the holes of the inner link plate 2 are larger than those of the outer link plate 4. Each one end of cylindrical oil-impregnated bushings 3 and 3 is tightly fitted in each of the two holes 2a and 2a of one inner link plate 2, and each another end of the oil-impregnated bushings 3 and 3 is tightly fitted in each of the two holes 2a and 2a of the other inner link plate 2, whereby the inner link plates 2 and 2 are connected each other. Cylindrical rollers 6 and 6 having an inside diameter larger than the outside diameter of the oil-impregnated bushings 3 and 3 are rotatably fitted on the oil-impregnated bushings 3 and 3.

Each one end of cylindrical pins 5 and 5 is tightly fitted in each of the two holes 4a and 4a of one outer link plate 4. The diameter of the pins 5 and 5 is smaller than the inside diameter of the oil-impregnated bushings 3 and 3, and the length of the pins is longer than the distance between the inner link plates 2 and 2. Each another end of the pins 5 and 5 is tightly fitted in each of the holes 4a and 4a of the other outer link plate 4, whereby the outer link plates 4 and 4 are connected each other.

Furthermore, one of the pins 5 and 5 fitted in one outer link plate 4 is inserted into one of the oil-impregnated bushings 3 and 3 of the inner link plates 2 and 2, and tightly fitted in one of the holes 4a and 4a of the other outer link plate 4 as described above, whereby the outer link plates 4 and 4 and the inner link plates 2 and 2 are connected alternately and the oil-free chain 1 is constructed.

The bushings before they are impregnated with the lubricant so as to produce the oil-impregnated bushings 3 are made of an iron-based sintered metal and have a plurality of pores.

"Diana Process PW380" (mineral oil produced by Idemitsu Kosan Co. Ltd.) was used as the lubricant impregnated in the bushings. This "Diana Process PW380" contains paraffinic hydrocarbons by 73% (% CP in the ring analysis (n-d-M) method) and naphthenic hydrocarbons by 27% (% CN in the above-mentioned ring analysis method).

The bushings were impregnated with the above-mentioned lubricant to produce the oil-impregnated bushings 3. After vacuuming, the bushings were immersed in the above-mentioned lubricant, outer air was introduced, and the bushings were impregnated with the lubricant. The temperature of the processing is approximately 100° C.

The obtained oil-impregnated bushings 3 were used to produce the oil-free chain 1.

Example 2

An oil-free chain according to Example 2 was produced by the same process as that of Example 1 except that "Plastol 2105" (mineral oil produced by Exxon Mobil Corporation.) was used as the lubricant impregnated in the bushings.

Example 3

An oil-free chain according to Example 3 was produced by the same process as that of Example 1 except that "Diana Fresia P430" (mineral oil produced by Idemitsu Kosan Co. Ltd.) was used as the lubricant impregnated in the bushings.

Example 4

An oil-free chain according to Example 4 was produced by the same process as that of Example 1 except that "Diana Process PW380" (mineral oil produced by Idemitsu Kosan Co. Ltd.) different from the lubricant according to Example 1 in lot number was used as the lubricant impregnated in the bushings.

Example 5

An oil-free chain according to Example 5 was produced by the same process as that of Example 1 except that "DURASYN 174" (synthetic PAO oil produced by BP Castrol K.K.) was used as the lubricant impregnated in the bushings.

Example 6

An oil-free chain according to Example 6 was produced by the same process as that of Example 1 except that 25 wt % of the above-mentioned "DURASYN 170" blended with 75 wt % of the above-mentioned "Diana Process PW380" was used as the lubricant impregnated in the bushings.

Comparative Example 1

An oil-free chain according to Comparative Example 1 was produced by the same process as that of Example 1 except that "Process P300" (mineral oil produced by JAPAN ENERGY CORPORATION) was used as the lubricant impregnated in the bushings.

Comparative Example 2

An oil-free chain according to Comparative Example 2 was produced by the same process as that of Example 1 except that "Process P500" (mineral oil produced by JAPAN ENERGY CORPORATION) was used as the lubricant impregnated in the bushings.

Comparative Example 3

An oil-free chain according to Comparative Example 3 was produced by the same process as that of Example 1 except that "Process EPT750" (mineral oil produced by JAPAN ENERGY CORPORATION) was used as the lubricant impregnated in the bushings.

Comparative Example 4

An oil-free chain according to Comparative Example 4 was produced by the same process as that of Example 1 except that 25 wt % of "Diana Process PW380" according to Example 4 mixed with 75 wt % of "Process P300" (mineral oil produced by JAPAN ENERGY CORPORATION) was used as the lubricant impregnated in the bushings.

Comparative Example 5

An oil-free chain according to Comparative Example 5 was produced by the same process as that of Example 1 except that "DURASYN 180" (synthetic PAO oil produced by BP Castrol K.K.) was used as the lubricant impregnated in the bushings.

Comparative Example 6

An oil-free chain according to Comparative Example 6 was produced by the same process as that of Example 1 except that 50 wt % of the above-mentioned "DURASYN 174" mixed with 50 wt % of the above-mentioned "DURASYN 180" was used as the lubricant impregnated in the bushings.

Mn and Mw of the lubricants according to Examples 1 to 6 and Comparative Examples 1 to 6 were obtained under the GPC measurement conditions described above. Table 1 given below shows the calculation results of Mw/Mn. Table 1 also shows the kinematic viscosity at 40° C. and the number of elution ingredients obtained under the above-mentioned measurement conditions.

TABLE 1

|  | Example 1 | Example 2 | Example 3 | Example 4 | Example 5 | Example 6 |
|---|---|---|---|---|---|---|
| Mn | 823 | 984 | 1171 | 1196 | 2296 | 1197 |
| Mw | 924 | 1078 | 1280 | 1371 | 2988 | 1355 |
| Mw/Mn | 1.12 | 1.10 | 1.09 | 1.15 | 1.30 | 1.13 |
| Number of elution ingredients | 1 | 1 | 1 | 1 | 1 | 1 |
| Kinematic viscosity at 40° C. (mm$^2$/s) | 381.6 | 387 | 419 | 381.6 | 359 | 230.8 |
| Abrasion elongation time (h) | 307 | 224 | 214.5 | 246.5 | 196 | 149 |
| Workability of impregnation | ○ | ○ | ○ | ○ | ○ | ○ |

|  | Comparative Example 1 | Comparative Example 2 | Comparative Example 3 | Comparative Example 4 | Comparative Example 5 | Comparative Example 6 |
|---|---|---|---|---|---|---|
| Mn | 569 | 649 | 760 | 692 | 3841 | 2848 |
| Mw | 677 | 751 | 926 | 890 | 5679 | 4306 |
| Mw/Mn | 1.19 | 1.16 | 1.22 | 1.29 | 1.48 | 1.51 |
| Number of elution ingredients | 1 | 1 | 1 | 1 | 1 | 1 |
| Kinematic viscosity at 40° C. (mm$^2$/s) | 59.7 | 97.6 | 160.5 | 92.4 | 1250 | 713.3 |
| Abrasion elongation time (h) | 61 | 78 | 88.5 | 96.5 | 159 | 189 |
| Workability of impregnation | ○ | ○ | ○ | ○ | x | x |

The following performance evaluation tests were conducted to evaluate the abrasion elongation-resistant lives of the oil-free chains according to Examples 1 to 6 and Comparative Examples 1 to 6.

Each oil-free chain (corresponding to Nominal No. 50 of JIS B1801-1895) was endlessly wound between two sprockets (the number of teeth: 16 T) at an ambient temperature of 60° C. In a state that a load (a surface pressure of 4.00 kN/cm$^2$ and a slipping velocity of 8.0 m/min) was applied from the center of one of the sprockets to a direction opposite to the direction toward the other sprocket, the sprockets were rotated at 500 rpm, and the operating time until the abrasion elongation amount of the oil-free chain reached 0.5% was measured. Table 1 given above shows the results of the measurement.

Table 1 also shows whether the workability during impregnation is good or not. In the case that the workability is good, "o" is entered, and in the case that the workability is bad, "x" is entered.

According to Table 1, the oil-free chains according to Examples 1 to 6 wherein Mn is 800 or more and 2300 or less and Mw/Mn is 1.0 or more and 1.3 or less are more improved significantly in the abrasion elongation-resistant time than the oil-free chains according to Comparative Examples 1 to 6 that are not satisfying these requirements, and it is found that the abrasion elongation-resistant lives thereof are improved.

In the case of the oil-free chains according to Comparative Examples 5 and 6, the kinematic viscosities are large, and defoaming during impregnation is not done properly. Hence, the impregnation process must be carried out while the degree of vacuum is adjusted up and down, thereby causing a problem in which the oil-free chains are low in workability in comparison with the other oil-free chains.

In the case that the kinematic viscosities of the lubricants at 40° C. are in the range of ISO-VG grade 46 to 460, the workability during impregnation is good. In addition, the differences in kinematic viscosity among the lubricants do not affect the abrasion-resistant elongation lives of the oil-free chains. No significant difference occurs in abrasion elongation-resistant life between Examples 3 and 4 in spite of the considerable difference in kinematic viscosity therebetween.

Next, Examples and Comparative Examples in the case that the number of elution ingredients among the elution ingredients obtained under the GPC measurement conditions described above is two or more will be described below. Herein, the phrase "in the case that the number of elution ingredients is two or more" means that the weight % of an ingredient having the highest content among the elution ingredients obtained under the above-mentioned measurement conditions is less than 95 wt %.

Example A

An oil-free chain according to Example A has the same configuration as the oil-free chain 1 according to Example 1 shown in FIG. 1.

As the lubricant impregnated in the oil-free chain, 75 wt % of "DURASYN 170" (synthetic PAO oil produced by BP Castrol K.K.) mixed with 25 wt % of the above-mentioned "Diana Process PW380" was used.

The bushings were impregnated with the above-mentioned lubricant to produce the oil-impregnated bushings 3. After vacuuming, the bushings were immersed in the above-mentioned lubricant, outer air was introduced, and the bushings were impregnated with the lubricant. The temperature of the processing is approximately 100° C.

The obtained oil-impregnated bushings 3 were used to produce the oil-free chain.

Example B

An oil-free chain according to Example B was produced by the same process as that of Example A except that 50 wt % of the above-mentioned "DURASYN 170" blended with 50 wt % of the above-mentioned "Diana Process PW380" was used as the lubricant impregnated in the bushings.

Example C

An oil-free chain according to Example C was produced by the same process as that of Example A except that 50 wt % of the above-mentioned "Diana Process PW380" mixed with 50 wt % of "Process P300" (mineral oil produced by JAPAN ENERGY CORPORATION) was used as the lubricant impregnated in the bushings.

Example D

An oil-free chain according to Example D was produced by the same process as that of Example A except that 85 wt % of alkyl diphenyl ether produced by MORESCO Corporation mixed with 15 wt % of PAO was used as the lubricant impregnated in the bushings.

Example E

An oil-free chain according to Example E was produced by the same process as that of Example A except that 70 wt % of alkyl diphenyl ether produced by MORESCO Corporation mixed with 30 wt % of PAO was used as the lubricant impregnated in the bushings.

Example F

An oil-free chain according to Example F was produced by the same process as that of Example A except that 50 wt % of the above-mentioned "DURASYN 170" mixed with 50 wt % of the above-mentioned "DURASYN 180" was used as the lubricant impregnated in the bushings.

Example G

An oil-free chain according to Example G was produced by the same process as that of Example A except that "Bonnoc AX 150" (PAO oil produced by NIPPON OIL CORPORATION) was used as the lubricant impregnated in the bushings.

Example H

An oil-free chain according to Example H was produced by the same process as that of Example A except that 25 wt % of the above-mentioned "DURASYN 170" mixed with 75 wt % of "DURASYN 174" (synthetic PAO oil produced by BP Castrol K.K.) was used as the lubricant impregnated in the bushings.

Example I

An oil-free chain according to Example I was produced by the same process as that of Example A except that "DURASYN 170" was used as the lubricant impregnated in the bushings.

Example J

An oil-free chain according to Example J was produced by the same process as that of Example A except that "DURASYN 168" (synthetic PAO oil produced by BP Castrol K.K.) was used as the lubricant impregnated in the bushings.

Comparative Example A

An oil-free chain according to Comparative Example A was produced by the same process as that of Example A except that 85 wt % of the above-mentioned "Bonnoc AX 150" mixed with 15 wt % of "Daphne Quench B" (quenching oil produced by Idemitsu Kosan Co. Ltd.) was used as the lubricant impregnated in the bushings.

Mn and Mw of the lubricants according to Examples A to J and Comparative Example A were obtained under the GPC measurement conditions described above. Table 2 given below shows the calculation results of Mw/Mn. Table 2 also shows the kinematic viscosity at 40° C. and the number of elution ingredients obtained under the GPC measurement conditions.

TABLE 2

|  | Example A | Example B | Example C | Example D | Example E |
|---|---|---|---|---|---|
| Mn | 1179 | 1196 | 806 | 1060 | 1156 |
| Mw | 1276 | 1318 | 1065 | 1496 | 1547 |
| Mw/Mn | 1.08 | 1.10 | 1.32 | 1.41 | 1.34 |
| Number of elution ingredients | 3 | 2 | 2 | 3 | 4 |
| Kinematic viscosity at 40° C. (mm²/s) | 95.3 | 146.3 | 145.8 | 151.2 | 153.3 |
| Abrasion elongation time (h) | 198.5 | 202 | 1.49 | 144 | 182 |
| Workability of impregnation | ○ | ○ | ○ | ○ | ○ |

|  | Example F | Example G | Example H | Example I | Example J | Comparative Example A |
|---|---|---|---|---|---|---|
| Mn | 1821 | 1395 | 1878 | 1133 | 1028 | 3452 |
| Mw | 3608 | 2096 | 2632 | 1208 | 1075 | 3851 |
| Mw/Mn | 1.98 | 1.50 | 1.40 | 1.07 | 1.04 | 1.12 |
| Number of elution ingredients | 3 | 6 | 5 | 2 | 3 | 6 |

TABLE 2-continued

| | | | | | | |
|---|---|---|---|---|---|---|
| Kinematic viscosity at 40° C. (mm²/s) | 287.7 | 150 | 243 | 62.9 | 45.8 | 97 |
| Abrasion elongation time (h) | 198 | 185 | 184 | 219.5 | 224.5 | 70 |
| Workability of impregnation | ○ | ○ | ○ | ○ | ○ | ○ |

The performance evaluation test described above was conducted to evaluate the abrasion elongation-resistant lives of the oil-free chains according to Examples A to J and Comparative Example A. Table 2 shows the results of the test. Table 2 also shows whether the workability during impregnation is good or not.

According to Table 2, the oil-free chains according to Examples A to J wherein Mn is 800 or more and 2300 or less and Mw/Mn is 1.0 or more and 2.0 or less are more improved significantly in abrasion elongation-resistant time than the oil-free chain according to Comparative Example A that is not satisfying these requirements, and it is found that the abrasion elongation-resistant lives thereof are improved.

Furthermore, in the case that the kinematic viscosities of the lubricants at 40° C. are in the range of ISO-VG grade 46 to 460, it is found that the workability during impregnation is good and that the abrasion-resistant elongation lives of the oil-free chains are sufficiently long.

INDUSTRIAL APPLICABILITY

The present invention is applicable to oil-free chains of a bushing chain type, a roller chain type, etc. for use in power transmission mechanisms, transport mechanisms, etc.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An oil-free chain constructed by alternately connecting a pair of outer link plates connected by two pins and a pair of inner link plates connected by two oil-impregnated bushings into which the adjacent pins of said outer link plates adjacent to said inner link plates are fitted, wherein
    said oil-impregnated bushings are impregnated with a lubricant comprising a base oil selected from the group consisting of mineral oil, synthetic oil, animal oil, and plant oil, having a kinematic viscosity measured by an ISO viscosity grade number in the range of VG 140 to 460,
    a weight % of an elution ingredient of the base oil having the highest content among elution ingredients obtained is less than 95 wt %, and a number average molecular weight in a range from about 800 to 2300, when the base oil is subjected to GPC (gel permeation chromatography) measurement conditions,
    wherein the GPC measurement conditions include:
a GPC system as a measuring instrument;
a column that is about 300 mm in length and 8 mm in inside diameter in three pieces;
a guard column that is about 10 mm in length and 4.6 mm in inside diameter;
a column temperature of about 40° C.;
a mobile phase including a GC grade tetrahydrofuran;
a flow rate of about 0.7 ml/min;
a pressure of about $2.9 \times 10^{-2}$ Pa;
a detector including a differential refractive index detector; and
a standard reference material including standard polystyrene, and
    a ratio of the weight average molecular weight obtained under the GPC measurement conditions to said number average molecular weight is in a range from about 1.0 to 2.0.

2. An oil-free chain constructed by alternately connecting a pair of outer link plates connected by two pins and a pair of inner link plates connected by two oil-impregnated bushings into which the adjacent pins of said outer link plates adjacent to said inner link plates are fitted, wherein
    said oil-impregnated bushings are impregnated with a lubricant comprising a base oil selected from the group consisting of mineral oil, synthetic oil, animal oil, and plant oil, having a kinematic viscosity measured by an ISO viscosity grade number in the range of VG 230 to 460,
    a weight % of an elution ingredient of the base oil having the highest content among elution ingredients obtained is 95 wt % or more, and a number average molecular weight in a range from about 800 to 2300, when the base oil is subjected to GPC (gel permeation chromatography) measurement conditions,
    wherein the GPC measurement conditions include:
a GPC system as a measuring instrument;
a column that is about 300 mm in length and 8 mm in inside diameter in three pieces;
a guard column that is about 10 mm in length and 4.6 mm in inside diameter;
a column temperature of about 40° C.;
a mobile phase including a GC grade tetrahydrofuran;
a flow rate of about 0.7 ml/min;
a pressure of about $2.9 \times 10^{-2}$ Pa;
a detector including a differential refractive index detector; and
a standard reference material including standard polystyrene, and
    a ratio of the weight average molecular weight obtained under the GPC measurement conditions to said number average molecular weight is in a range from about 1.0 to 1.3.

* * * * *